United States Patent
Ostermeir

(10) Patent No.: US 11,891,918 B2
(45) Date of Patent: Feb. 6, 2024

(54) ADJUSTMENT ASSEMBLY FOR ADJUSTABLE BLADES OR VANES OF A TURBOMACHINE

(71) Applicant: MTU Aero Engines AG, Munich (DE)

(72) Inventor: Oskar Ostermeir, Kottgeisering (DE)

(73) Assignee: MTU Aero Engines AG, Munich (DE)

( * ) Notice: Subject to any disclaimer, the term of this patent is extended or adjusted under 35 U.S.C. 154(b) by 0 days.

(21) Appl. No.: 17/931,345

(22) Filed: Sep. 12, 2022

(65) Prior Publication Data

US 2023/0077444 A1 Mar. 16, 2023

(30) Foreign Application Priority Data

Sep. 14, 2021 (DE) ...................... 10 2021 123 772.6

(51) Int. Cl.
*F01D 7/00* (2006.01)
*F01D 9/04* (2006.01)

(52) U.S. Cl.
CPC ............... *F01D 7/00* (2013.01); *F01D 9/041* (2013.01); *F05D 2220/323* (2013.01)

(58) Field of Classification Search
CPC .......... F01D 7/00; F01D 9/041; F01D 17/162; F01D 17/167; F05D 2240/12; F05D 2240/128
See application file for complete search history.

(56) References Cited

U.S. PATENT DOCUMENTS

| 2,858,062 A * | 10/1958 | Allen .................... F01D 17/162 |
| | | 415/150 |
| 2,933,234 A * | 4/1960 | Neumann ............. F01D 17/162 |
| | | 415/150 |
| 2,999,630 A | 9/1961 | Warren et al. |
| 3,861,822 A | 1/1975 | Wanger |
| 4,295,784 A | 10/1981 | Manning |
| 4,720,237 A | 1/1988 | Weiner et al. |
| 5,692,879 A | 12/1997 | Charbonnel |
| 6,398,483 B1 | 6/2002 | Conete et al. |
| 7,273,346 B2 | 9/2007 | Bouru |
| 9,394,804 B2 * | 7/2016 | Rusovici ............... F01D 17/162 |

(Continued)

FOREIGN PATENT DOCUMENTS

| DE | 33540 A3 | 11/1965 |
| DE | 2512292 A1 | 10/1975 |

(Continued)

*Primary Examiner* — Courtney D Heinle
*Assistant Examiner* — Danielle M. Christensen
(74) *Attorney, Agent, or Firm* — Hinckley, Allen & Snyder, LLP; David R. Josephs

(57) ABSTRACT

The present invention relates to an adjustment assembly for the adjustment of adjustable blades or vanes of a turbomachine, having an adjustment ring for coupling to the adjustable blades or vanes of a blade or vane ring and having an adjusting mechanism, which has a coupling rod for coupling to a further blade or vane ring as well as a lever and a push rod, wherein the lever is rotatably mounted at a pivot and has a load arm as well as a force arm, wherein the load arm of the lever is coupled to the push rod and its force arm is coupled to the coupling rod, on different sides of the lever, so that an offset of the coupling rod via the lever and the push rod is converted to a rotation of the adjustment ring around the ring axis thereof.

15 Claims, 5 Drawing Sheets

(56) References Cited

U.S. PATENT DOCUMENTS

| | | |
|---|---|---|
| 10,711,798 B2 | 7/2020 | Halcoussis |
| 2005/0129510 A1 | 6/2005 | Raine et al. |
| 2021/0003029 A1 | 1/2021 | Ward |

FOREIGN PATENT DOCUMENTS

| | | | | |
|---|---|---|---|---|
| DE | 3913102 C1 | 5/1990 | | |
| EP | 1724471 A2 | 11/2006 | | |
| FR | 1246176 A | 11/1960 | | |
| JP | H0219698 | * | 1/1990 | ............ F04D 29/46 |

* cited by examiner

ADJUSTMENT ASSEMBLY FOR ADJUSTABLE BLADES OR VANES OF A TURBOMACHINE

BACKGROUND OF THE INVENTION

The present invention relates to an adjustment assembly for the adjustment of adjustable blades or vanes of a turbomachine.

The turbomachine can involve, for example, a jet engine, such as, for example, a turbofan engine. Functionally, the turbomachine is divided into a compressor, a combustion chamber, and a turbine. In the case of the jet engine, for instance, air intake is compressed by the compressor and undergoes combustion with admixed kerosene in the downstream combustion chamber. The resulting hot gas, a mixture of combustion gas and air, flows through the downstream turbine and is expanded in this way. As a rule, both the compressor and the turbine are composed of several stages, each of which has a stator (guide vane ring) and a rotor (rotating blade ring).

Blade or vane rings with adjustable blades or vanes are utilized in compressors and turbines of turbomachines. An adjustment assembly for adjusting the blades or vanes can comprise an adjustment ring that can rotate around a ring axis or longitudinal axis of the turbomachine, whereby this rotational movement is then coupled to the individual blades or vanes of the blade or vane ring by means of, for example, adjustment levers distributed over the circumference, each of which transmits the circumferential offset of the adjustment ring to the respective adjustable blade or vane. The focus of the present application is directed at the upstream mechanism, namely, the mechanism for adjusting the adjustment ring. Accordingly, the adjustment ring can be offset in the circumferential direction; that is, it can rotate a bit far around its ring axis.

SUMMARY OF THE INVENTION

The present invention is based on the technical problem of specifying an advantageous adjustment assembly for adjustable blades or vanes of a turbomachine.

This problem is solved in accordance with the invention by the adjustment assembly according to claim 1. This adjustment assembly has, in addition to the adjustment ring, a lever and a push rod, the latter of which couples the lever to the adjustment ring. Further provided is a coupling rod, which serves for coupling to one other blade or vane ring or to a plurality of other blade or vane rings with adjustable blades or vanes, that is, which can bring about a simultaneous adjustment over and beyond the individual stages. In this case, the coupling rod is coupled to a force arm of the lever that is rotatably mounted at a pivot, whereby the load arm thereof is coupled to the push rod and thus to the adjustment ring.

Via the lever, an offset, in particular an axial offset, of the coupling rod is converted to an at least proportional circumferential or rotational offset of the push rod and thus to a rotation of the adjustment ring. The coupling rod and the push rod are arranged here on different sides of the lever, so that the coupling rod and the push rod are not able to cross each other radially, for example. As discussed below in detail, this can make possible an essentially planar and, in relation to the adjustment ring, a tangential arrangement of the adjusting mechanism, which can be advantageous in regard to the application of force and precision, for example, and can also reduce wear at the linkage sites, for example.

If one views a first coupling point of the push rod, at which the latter is coupled to the adjustment ring, and a second coupling point, at which the push rod is coupled to the lever, then these two points, as viewed in the radial direction, are arranged on the same side of the coupling rod, because the two rods do not cross each other. This makes possible the essentially planar arrangement. Viewed axially, the arrangement can be "on different sides of the lever" in that, for example, the coupling rod is arranged at one end of the lever and the push rod extends at the opposite end of the lever away from it and the coupling rod.

Preferred embodiments are found in the dependent claims and in the entire disclosure, whereby, in the description of the features, a distinction is not always made in detail between device aspects, method aspects, and use aspects; in any case, the disclosure is implicitly to be read in terms of all claim categories. Furthermore, the disclosure is always to be read both in terms of the adjustment assembly and in terms of a module or a turbomachine having such an adjustment assembly.

In the scope of this disclosure, the notations "axially," "radially," and "circumferentially" as well the associated directions (axial direction, etc.) refer to the ring axis around which the adjustment ring with the adjusting mechanism can be adjusted, that is, can be rotated. This ring axis typically coincides with a longitudinal axis of the module or of the turbomachine, around which, for example, the rotating blade rings thereof rotate during operation. Within a respective blade or vane ring, in particular a guide vane ring, the adjustable blades or vanes are arranged in a circumferential distribution and a plurality of adjustable blade or vane rings can be arranged in succession in an axial offset manner. The adjustment can alter the angle of attack of the adjustable blades or vanes depending on, for example, the operating state of the turbomachine.

In accordance with a preferred embodiment, the push rod is inclined by an amount of at most 10° with respect to a plane that spans the lever. Further upper limits can lie, for example, at an amount of at most 8°, 6°, 4°, or 2°. Preferably, the inclination of the push rod with respect to the plane lies within an appropriate interval, also taking into consideration any angular deflection that can ensue owing to the adjustment. The inclination can also lie at 0° (the push rod lies in the plane), in any case in a zero position of the adjustment ring. The essentially inclination-free connection between the push rod and the lever can enable, for example, a relatively linear application of force to be achieved, which reduces the wear and, for example, can also increase the precision.

In detail, the plane that is spanned by the lever can include, for example, the pivot thereof as well the coupling points to the push rod and the coupling rod. The inclination of the push rod with respect to this plane is then based, for example, on a straight connecting line laid in the push rod, which connects the coupling points thereof (to the adjustment ring and to the lever) to each other. In general, the push rod can also in itself have an arched course; preferably, however, it extends in a straight line.

In a preferred embodiment, the coupling rod lies in a plane that is spanned by the lever, with reference being made to the preceding paragraphs in regard to the definition of the plane, which preferably is combined with the essentially non-inclined push rod. Accordingly, it is possible, as viewed in the axial direction, for example, to achieve an overall linear construction (reduced wear and increased precision). It is thereby possible, for example, also to decrease any oblique load on the push rod or coupling rod, which could otherwise lead to a greater weight of the rod(s) or also of the lever in terms of its structural mechanical design.

As discussed below in detail, the adjusting mechanism can preferably have further levers and push rods, which are assigned at the coupling rods in an axially offset manner to different blade and vane rings or stages. Especially preferably, these levers can lie in a common plane (their coupling points and pivots thus lie in the same plane). In general, the coupling rod has an at least proportional axial extension for connection of the rings or stages; preferably, it lies parallel to the axial direction. Accordingly, in a preferred embodiment, said plane containing the coupling rod and/or the lever then also lies axially parallel.

In general, the lever or levers can also be formed, for example, with a kink or a curve, whereby the two coupling points and the pivot nonetheless span a plane. In a preferred embodiment, however, the lever is an overall planar component and this preferably also holds true for the levers of the other rings or stages.

In accordance with a preferred embodiment, the push rod lies essentially parallel to a tangent at the adjustment ring. This tangent is placed at the adjustment ring at a first coupling point at which the push rod is coupled to the adjustment ring. The push rod, which is "essentially parallel" to the tangent, can be inclined, for example, by an amount of at most 10°, 8°, 6°, or 4° with respect to the tangent. Preferably, the push rod lies over and beyond the adjustment path in an appropriate interval, that is, also taking into consideration any angular offset owing to the adjustment. In any case, in a zero position of the adjustment ring, the angle can also be 0°.

In accordance with a preferred embodiment, the first coupling point is spaced apart radially by at most 3 cm from the adjustment ring. In general, this suspension point can also be arranged, for example, on a pin that protrudes radially outward at the adjustment ring and accordingly can lie a bit radially outward at a radial offset. Preferably, however, the first coupling point is as close as possible to the ring, such as, for instance, increasingly preferred in the order given at an outward radial offset of at most at 2.5 cm, 2 cm, 1.5 cm, 1 cm, or 0.5 cm, as a result of which it is possible, for example, to reduce additional deformation torques on the ring.

In accordance with a preferred embodiment, at least one of the coupling points of the push rod, that is, the first coupling point (to the adjustment ring) and/or the second coupling point (to the lever), can be formed by a ball joint. In terms of the detailed kinematic design, this can open up degrees of freedom, whereby the "linear" load on the ball joint that ensues from the present subject can reduce the wear thereof.

In general, the adjustment assembly can have, in addition to the adjusting mechanism, preferably an actuator, in particular a linear actuator. It can be arranged in such a way that its adjustment path has an axial component and preferably lies axially parallel. The actuator can then preferably be coupled to one of the different rings or stages, whereby the adjustment can then be transmitted from this lever to the other levers by means of the coupling rod. Regardless of these details, the actuator in a preferred embodiment is arranged in such a way that, as viewed in the axial direction, it lies on a straight line together with the lever and the push rod. This straight line preferably lies tangentially to the adjustment ring—see the preceding remarks.

As already mentioned, in a preferred embodiment, a plurality of adjustment rings are provided, which are assigned to the axially offset blade or vane rings (each for adjusting the respective adjustable blades or vanes). Specifically, there can also be a second adjustment ring, which is connected via a second push rod and a second lever to the coupling rod in such a way that the second lever converts an offset of the coupling rod, in particular an axial offset, to an offset of the second push rod, in particular a circumferential offset.

In accordance with a preferred embodiment, the axially successive levers differ in terms of their load arms and/or in terms of their force arms and preferably in terms of both. The load arm can determine, for example, how far the respective push rod and thus the respective adjustment ring is offset, whereby this offset can decrease in an adjustable compressor, for example, in going from axially in front to axially in back. Via the force arm, it is possible to govern the force and thus the torque that is applied.

The invention also relates to a module of a turbomachine, in particular a compressor module. The module has a plurality of blade or vane rings, each of which is equipped with adjustable blades or vanes, whereby what are involved are, in particular, adjustable guide vane rings. In this case, each adjustable blade or vane ring is associated with an adjustment ring, whereby these adjustment rings are connected to one another via the previously described adjusting mechanism. The individual adjustable blades or vanes can then preferably each couple to an adjustment lever at the respective adjustment ring, so that, via the lever, the rotational offset thereof rotates the adjustable blades or vanes, that is, alters their angle of attack.

The invention also relates to a turbomachine having an above-disclosed adjustment assembly or having a that has just been mentioned, preferably an aircraft engine, especially preferred a turbofan engine. The invention further relates to the use of a presently described adjustment assembly for the adjustment of adjustable blades or vanes.

BRIEF DESCRIPTION OF THE DRAWING FIGURES

The invention will be explained in detail below on the basis of an exemplary embodiment, whereby, in the scope of the dependent claims, the individual features can also be an essential part of the invention in other combinations and, furthermore, no distinction is made in particular between the different claim categories.

In detail:

DESCRIPTION OF THE INVENTION

Figure 1:
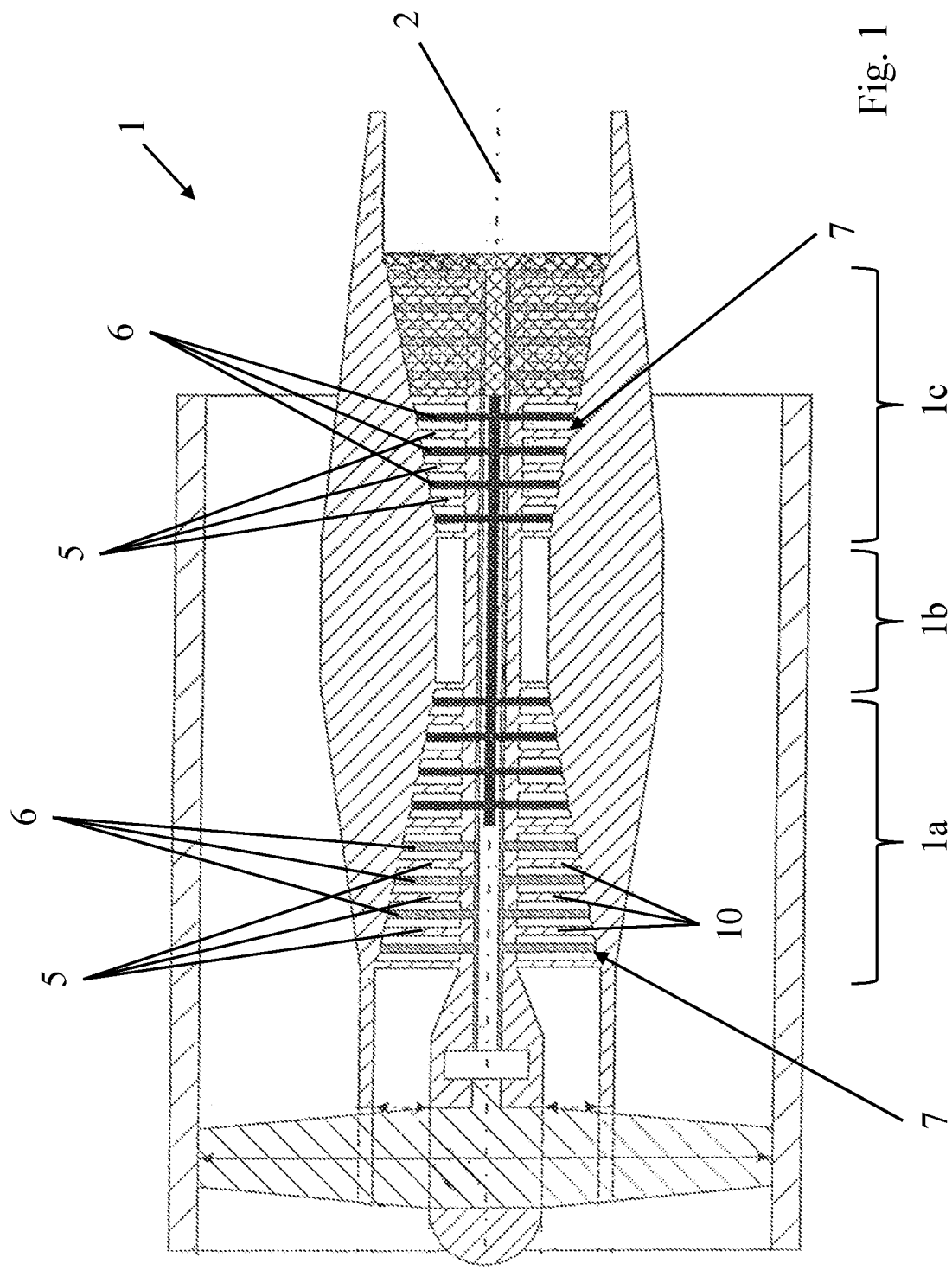
FIG. 1 shows a turbomachine, namely, an aircraft engine in an axial section.

FIG. 1 shows a turbomachine 1, specifically a turbofan engine, in an axial section. The turbomachine 1 is divided functionally into a compressor 1a, a combustion chamber 1b, and a turbine 1c. Both the compressor 1a and the turbine 1c are each composed of a plurality of stages. Each of the stages is composed of a guide vane ring 5 and a rotating blade ring 6. The reference number 7 refers to the gas duct, that is, the compressor gas duct in the case of the compressor 1*a* or the hot gas duct in the case of the turbine 1*c*. In the compressor gas duct, the air intake is compressed and then undergoes combustion with admixed kerosene in the downstream combustion chamber 1*b*. The hot gas flows through the hot gas duct and thereby drives the rotating blade rings 6, which rotate around a ring axis 2.

In the present example, a plurality of the guide vane rings 5 of the compressor 1*a* are equipped with adjustable blades or vanes 10, which can be adjusted for adaptation of the angle of attack. The adjustment axis (which is not shown here) of a respective adjustable blade or vane 10 here lies in each case essentially radially to the ring axis 2, which coincides with a longitudinal axis of the turbomachine.

Figure 2:
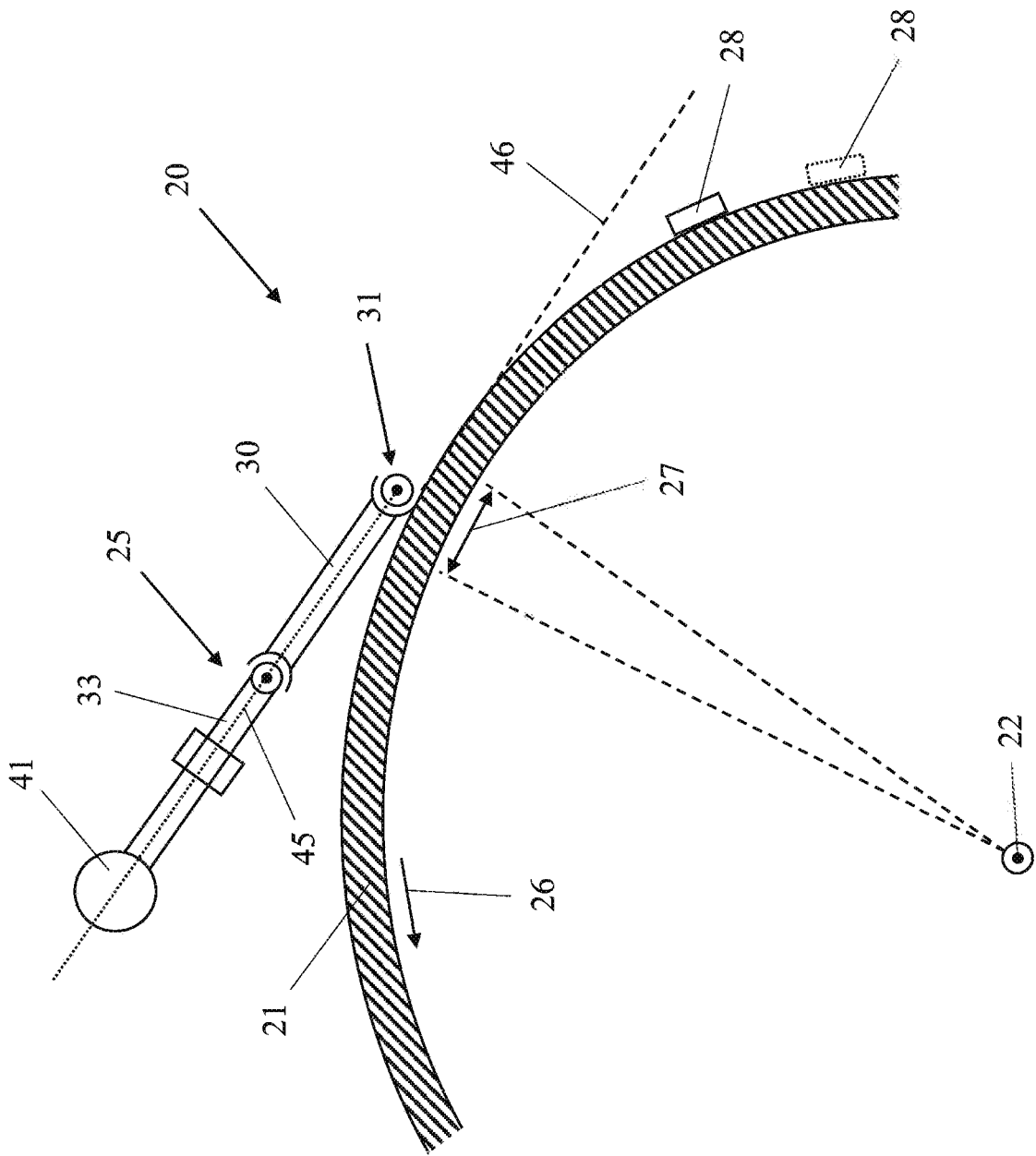
FIG. 2 shows an adjustment assembly in accordance with the invention in an axial view.

FIG. 2 shows an adjustment assembly 20 in accordance with the invention, by means of which the adjustable blades or vanes 10 can be adjusted. It has an adjustment ring 21, whereby each guide vane ring 5 is associated with a respective adjustment ring 21 and these adjustment rings 21 are offset axially with respect to one another, that is, spaced apart in an axial direction 22 with respect to one another. Via an adjusting mechanism 25, which is described in detail below, it is possible to rotate the adjustment rings 21, namely, to offset them in the direction of rotation 26. This rotational offset 27 of the adjustment ring 21 is transmitted via a respective lever 28 to the respective adjustable blade or vane 10 (not depicted in detail), thereby resulting in the described change in the angle of attack.

Figure 3:
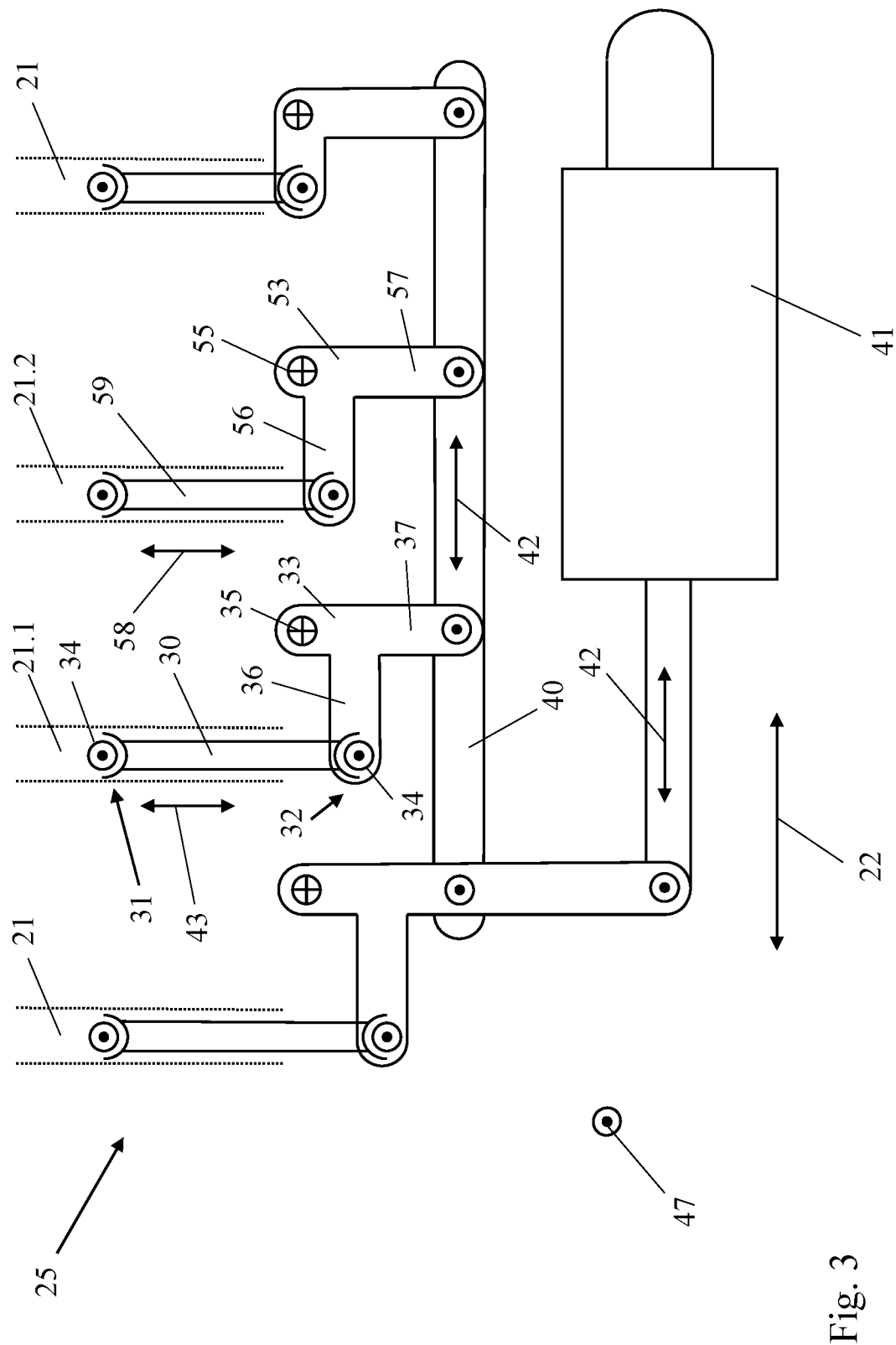
FIG. 3 shows a part of the adjustment assembly in accordance with FIG. 2 in a radial view.

FIG. 3 shows, in a radial view from the top, the adjusting mechanism 25, which, in the present example, is designed for simultaneous actuation of four axially successive guide vane rings 5. The corresponding adjustment rings 21 are indicated with dotted lines. The adjustment mechanism is discussed below on the basis of the second adjustment ring 21 from the left (referred to in the following also as the "first adjustment ring 21.1"); this applies analogously to the other adjustment rings 21. Provided for coupling to the adjustment ring 21 is a push rod 30, which is coupled at a first coupling point 31 to the adjustment ring 21 and is coupled at a second coupling point 32 to a lever 33. The coupling points 31, 32 are here each realized via a ball joint 34.

The lever 33 is rotatably mounted at a pivot 35 and has a load arm 36 as well as a force arm 37. Coupled to the load arm 36 is the push rod 30; in contrast, coupled to the force arm 37 is a coupling rod 40. The latter extends along the axial direction 22 and connects the individual guide vane rings 5 to one another. By means of an actuator 41, it is possible to produce an axial offset 42 and to transmit it to the coupling rod 40, whereby this axial offset 42 is converted by the rotatable mounting of the lever 33 to an offset 43 of the push rod 30, as a result of which the adjustment ring 21 is rotated.

The lever 33 is arranged between the coupling rod 40 and the push rod 30 and the latter extends, facing away from the coupling rod 40, away from the lever 33. Accordingly, the push rod 30 is arranged completely on one side of the lever 33, whereas both coupling points 31, 32, as viewed radially (as viewed in the radial direction 47), lie on the same side. This permits an overall planar arrangement of the push rod 30, of the lever 33, and of the coupling rod 40. The entire adjusting mechanism 25 can thus be aligned essentially tangentially to the adjustment ring 21; see FIG. 2 for illustration. There, the plane 45 that is spanned by the lever 33 can be seen schematically; it and thus the lever 33 as well as the push rod 30 lie essentially parallel to a tangent 46.

Furthermore, by way of example, a second lever 53 is shown for reference, which likewise has a load arm 56 as well as a force arm 57 and is rotatably mounted at a pivot 55. The second lever 53 is likewise connected to the coupling rod 40 and converts the axial offset 42 to an offset 58 of the second push rod 59 and thus of the associated adjustment ring 21 ("second adjustment ring 21.2"). The levers 33, 53 differ here in terms of their respective dimensioning of the load arm 36, 56 and the force arm 37, 57.

Figure 4:
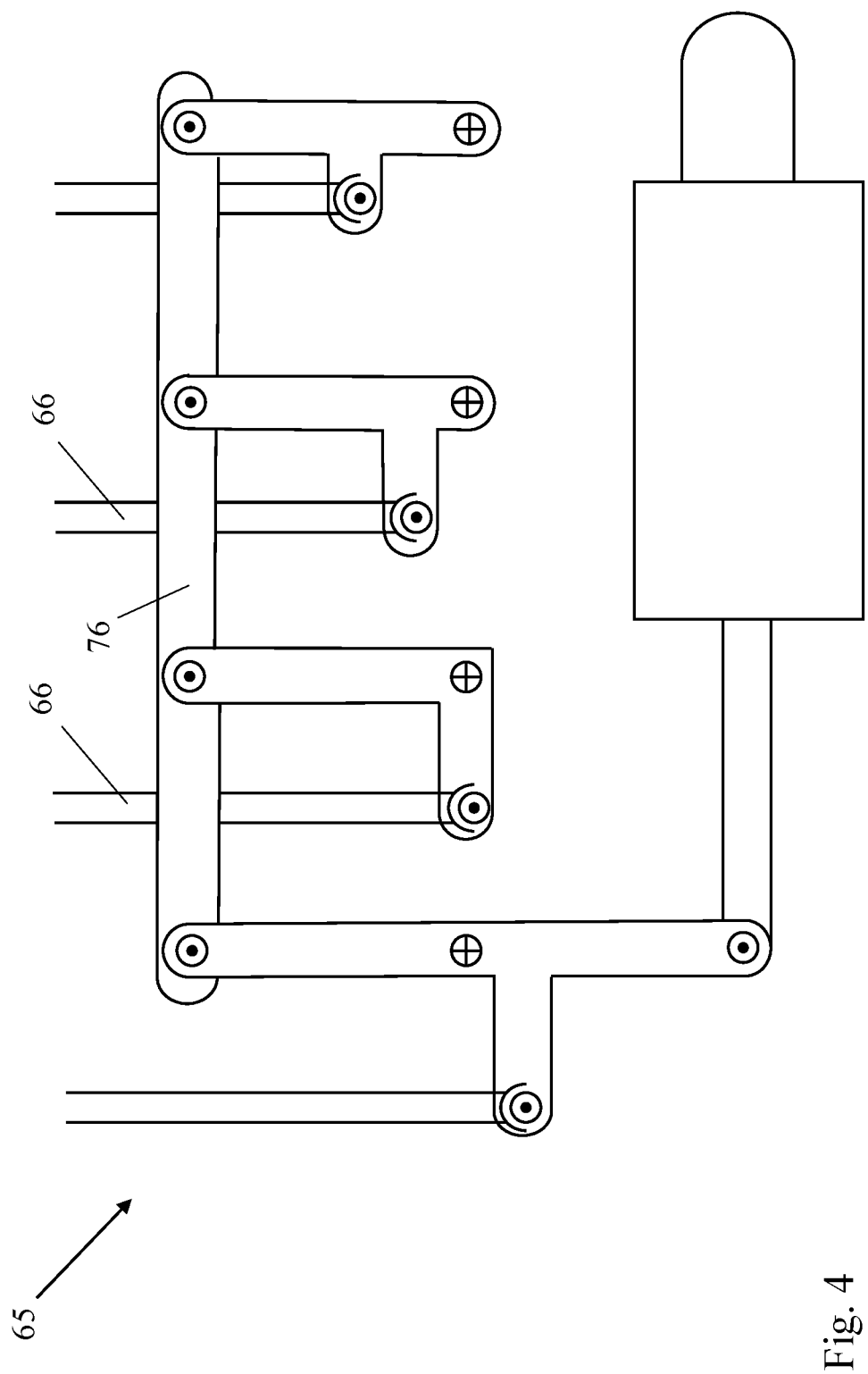
FIG. 4 shows for comparison, an arrangement with crossing coupling and push rods, which is not in accordance with the invention.
Figure 5:
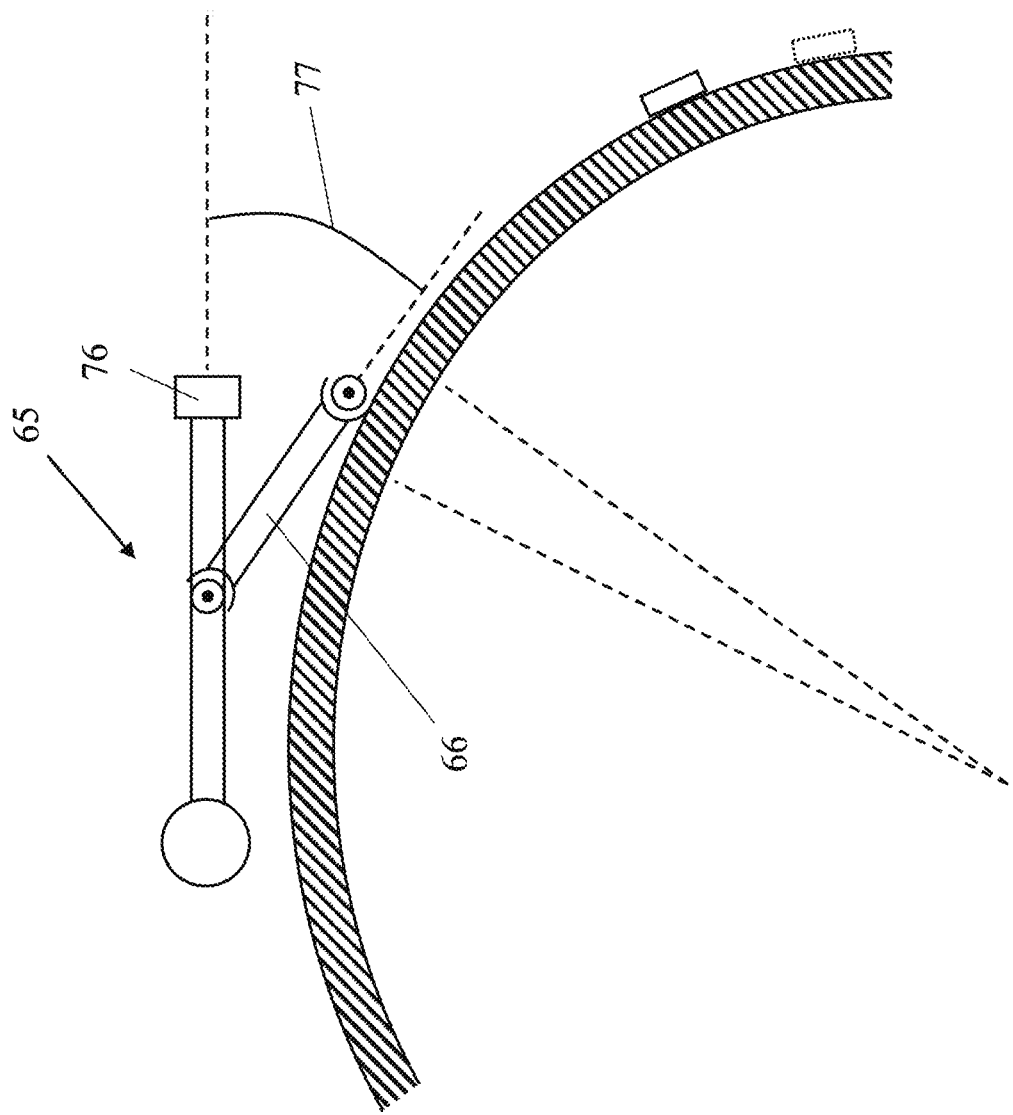
FIG. 5 shows the arrangement that is not in accordance with the invention in an axial view in accordance with FIG. 4.

FIG. 4 shows, for comparison, an adjusting mechanism 65 that is not designed in accordance with the invention, in which the push rods 66 do not extend away from the coupling rod 76, but rather, as viewed radially, they cross each other. The adjusting mechanism 65 is therefore designed with a kink, which becomes clear in the axial view in accordance with FIG. 5. The push rods 66 are deflected with respect to the remaining adjusting mechanism 65 by an angle 77, thereby resulting in an oblique application of force, which can contribute to wear and lack of precision.

What is claimed is:

1. An adjustment assembly for the adjustment of adjustable blades or vanes of a turbomachine, comprising:
   an adjustment ring for coupling to the adjustable blades or vanes of a blade or vane ring and
   an adjusting mechanism, which has a coupling rod for coupling to a further blade or vane ring as well as a lever and a push rod, the push rod lying in a plane that is spanned by the lever, the coupling rod lying in the plane that is spanned by the lever,
   wherein the lever is rotatably mounted at a pivot and has a load arm as well as a force arm,
   wherein the load arm of the lever is coupled to the push rod and its force arm is coupled to the coupling rod, so that an offset of the coupling rod via the lever and the push rod is converted to a rotation of the adjustment ring around the ring axis thereof,
   and wherein the coupling rod and the push rod are arranged on different sides of the lever.

2. The adjustment assembly according to claim 1, wherein the push rod is inclined with respect to the plane that is spanned by the lever by an amount of at most 10°.

3. The adjustment assembly according to claim 1, wherein the lever is a completely planar component.

4. The adjustment assembly according to claim 1, wherein the push rod is inclined by an amount of at most 10° at the adjustment ring with respect to a tangent, which is laid at a first coupling point where the push rod is coupled to the adjustment ring.

5. The adjustment assembly according to claim 1, wherein a first coupling point, at which the push rod is coupled to the adjustment ring, is spaced radially apart by at most 3 cm from the adjustment ring.

6. The adjustment assembly according to claim 1, wherein the push rod is coupled at a first coupling point to the adjustment ring and is coupled at a second coupling point to the lever, wherein at least one of the coupling points is formed by a ball joint.

7. The adjustment assembly according to claim 1, further comprising:
   an actuator for adjustment of the lever and of the push rod, wherein the actuator, the lever, and the push rod lie on a straight line, as viewed axially.

8. The adjustment assembly according to claim 1, further comprising:
   a second adjustment ring, which is configured and arranged for coupling to adjustable blades or vanes of a further blade or vane ring, wherein the adjustment rings are axially offset and the coupling rod couples the axially offset adjustment rings to one another.

9. The adjustment assembly according to claim 8, wherein the second adjustment ring is connected via a second push rod and a second lever to the coupling rod, wherein the second lever is rotatably mounted at a pivot and has a load arm as well as a force arm, wherein the load arm and/or the force arm of the second lever differs from the first lever.

10. A module with guide vane rings, each of which has adjustable vanes, and with the adjustment assembly according to claim 8, wherein the adjustable vanes of a respective guide vane ring are each coupled via an adjustment lever to a respective adjustment ring.

11. An aircraft engine having the module according to claim 10.

12. Using the module according to claim 10 for the adjustment of adjustable blades or vanes.

13. An aircraft engine having the adjustment assembly according to claim 1.

14. Using the aircraft engine according to claim 13 for the adjustment of adjustable blades or vanes.

15. Using the adjustment assembly according to claim 1 for adjustment of adjustable blades or vanes.

\* \* \* \* \*